United States Patent [19]

Nashold

[11] B 3,981,606
[45] Sept. 21, 1976

[54] MACHINE BORING TOOL

[75] Inventor: Robert Wilfred Nashold, New Richmond, Ohio

[73] Assignee: Cincinnati Milacron, Inc., Cincinnati, Ohio

[22] Filed: Aug. 30, 1974

[21] Appl. No.: 501,993

[44] Published under the second Trial Voluntary Protest Program on January 13, 1976 as document No. B 501,993.

[52] U.S. Cl. .................................. 408/124; 29/568
[51] Int. Cl.² .......................................... B23B 43/00
[58] Field of Search ............... 408/48, 53, 213, 124, 408/126, 128; 90/15 A; 299/80; 29/26 A, 568

[56] References Cited
UNITED STATES PATENTS
3,555,963  1/1971  Evans.............................. 29/26 A X FOREIGN PATENTS OR APPLICATIONS
1,947,630  4/1971  Germany ........................... 408/213
625,468  9/1961  Italy ................................... 408/124

Primary Examiner—Travis S. McGehee
Assistant Examiner—Z. R. Bilinsky
Attorney, Agent, or Firm—Thomas M. Farrell

[57] ABSTRACT

This invention relates to a machine tool which utilizes individual tool modules of a uniform size which can be attached to and operated by a spindle wherein a tool module is provided having the capability of boring holes which are larger than the module itself yet the module assumes a uniform size with other like modules for storage.

5 Claims, 4 Drawing Figures

MACHINE BORING TOOL

BACKGROUND OF THE INVENTION

This invention relates to machines utilizing interchangeable toolheads wherein the toolheads are changed manually or by automatic means. For example, the machine tool shown in the U.S. Pat. No. 3,650,018 of Perry et al. which shows automatic transfer means for moving toolheads to and from a working zone and further, shows a storage bin wherein tool modules may be kept when not in use.

In particular, the tool module of the within invention relates to the operation known as boring, wherein an internal hole may be machined in a workpiece by a rotating skiving tool. Since it is imperative that the tool module be of a uniform size with the other tool modules used on the machine, it is evident that to provide a boring tool module, the tool may only extend to the sides of a box-like module so that when it is stored the tool will not extend beyond the sides and bump adjacent modules. This means that the size of the hole which can be bored is limited to the dimensions of the box-like module.

Most modules bring the main power drive shaft through the center of the rear of the module housing and tend to balance the number of tools which are provided from the opposite, working face of the module, about the central drive axis. If only one tool is used, it is generally located on the housing center coaxial with the main drive axis. Thus, in order to achieve a boring capability having a radius which extends beyond the housing confines of the module, it would be necessary to have a boring arm reach which extends radially from the center of the module outward beyond the enclose of the module box and retracts within the envelope of the box-like housing when it is desired to store the module. To have an extendable arm for this purpose, a relatively weak member is thus created since joints are involved in the construction.

The problem, therefore, of providing a tool module having a capability of boring a hole larger than the module size is obviated in a novel manner by the present invention.

It is an object, therefore, of the present invention to provide a capability to an interchangeable tool module of boring an internal in a workpiece which is larger than the tool module.

Another object of the within invention is to provide a boring module having a relatively stiff boring arm.

A still further object of the present invention is to provide an interchangeable tool module having a large diameter boring capability yet capable of being stored with a series of uniform tool modules without interference.

SUMMARY OF THE INVENTION

The invention contained herein comprises a tool unit for machine tools utilizing interchangeable toolheads which is capable of boring large diameter holes; i.e., holes larger than the tool module envelope which is facing the hole to be bored.

The tool module comprises a box-like housing which is registered on a suitable registering face on the machine tool, and further, the module is adapted to receive a main drive input from the machine tool.

A gear train is provided within the housing so that the main drive input may be transferred to a parallel output shaft which is displaced from the center of the housing to a substantially remote corner of the box-like housing face. This output shaft extends through the front face of the housing toward the work to be machined and has mounted thereto one end of an arm having a boring tool located at its outboard end.

The reach of the arm is such that when the arm is located on a diagonal line through the face of the box-like housing the arm does not extend beyond the four sides of the box. When the arm is rotated with the output shaft the boring tool swings outward beyond the envelope of the housing and skives a large diameter circle for machining bores in a workpiece. It is seen, therefore, that the workpiece must be located with its bore center coaxial with the center of the output shaft in the housing.

When it is desired to store the housing and to remove it from the machine, the arm is brought back within the enclose of the housing and positioned along the diagonal line through the corners of the housing and, as an alternative embodiment, locked into position by detent means. The housing is then removed from the registering means on the machine tool and transferred manually or by automatic means to a tool storage matrix where the boring bar will not interfere with other tool modules of like uniform size.

DESCRIPTION OF THE PREFERRED EMBODIMENT

Figure 1:
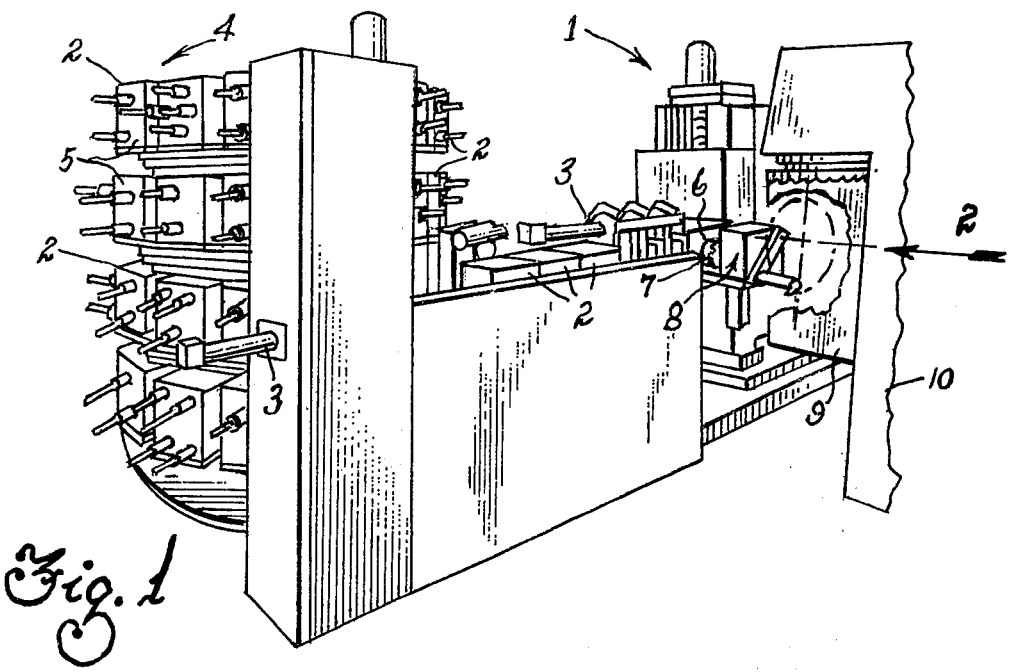
FIG. 1 illustrates a machine tool utilizing interchangeable toolheads, further showing automatic means for transferring heads to and from the machine tool and a toolhead storage matrix.

FIG. 1 illustrates a machine tool 1 which utilizes interchangeable tool modules 2. Transfer means 3 are provided so that the tool modules may be transferred in orderly inlet queues and exit queues to provide new toolheads as needed. When the tools are not being used they are kept in a tool storage matrix 4 where all tool modules 2 are of a uniform size having a box-like housing 5. The machine tool 1 is fitted with a spindle 6 and a registering means 7 so that the tool modules 2 may be aligned with and adapted to the spindle 6 and power may be transferred into the tool module 2. The tool module 2 shown on the machine tool 1 comprises a boring toolhead 8 which is capable of boring holes having a diameter larger than the module size.

A workpiece 9 is located on a work support station 10 and the boring toolhead 8, in this case, is adjusted in position so that its center of boring arm swing is located on the center of the hole to the machine. However, it is possible on other types of machine tools utilizing similar boring heads that the work may be moved relative to the toolhead.

Figure 2:
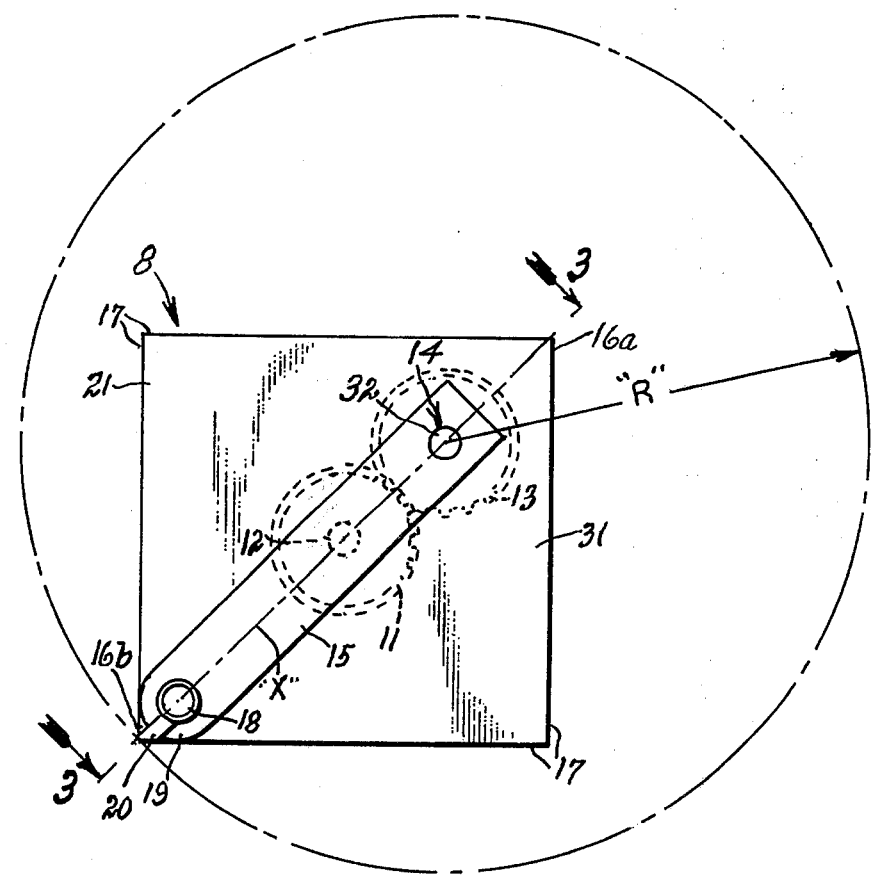
FIG. 2 is a front elevation view taken in the direction of arrow 2 on FIG. 1, depicting a toolhead having a boring bar and boring arm.

Turning now to FIG. 2, a front elevation of the boring toolhead 8 is shown. The driving gear 11 is located coaxially on the input shaft 12 and transmits power to a driven gear 13 which is located on the output shaft 14 which forms the center of the boring arm swing.

The boring arm 15 is shown lying on a diagonal line, "X", drawn through the corners 16a, 16b, of the box-like housing across the center of the input shaft 12 where it may be seen that no portion of the boring arm 15 extends beyond the outline 17 of the boring toolhead 8. A boring bar 18 is shown extending from the furthermost end 19 of the boring arm 15 relative to the output shaft 14.

When the boring arm 15 is swung about the center of the output shaft 14, the radius, "R", described by the boring tool 20 is the size of the bore which may be made in a workpiece. This, of course, is the maximum diameter which may be bored, but it is possible to position the boring tool 20 at any point along the boring arm 15 to describe smaller arcs.

Figure 3:
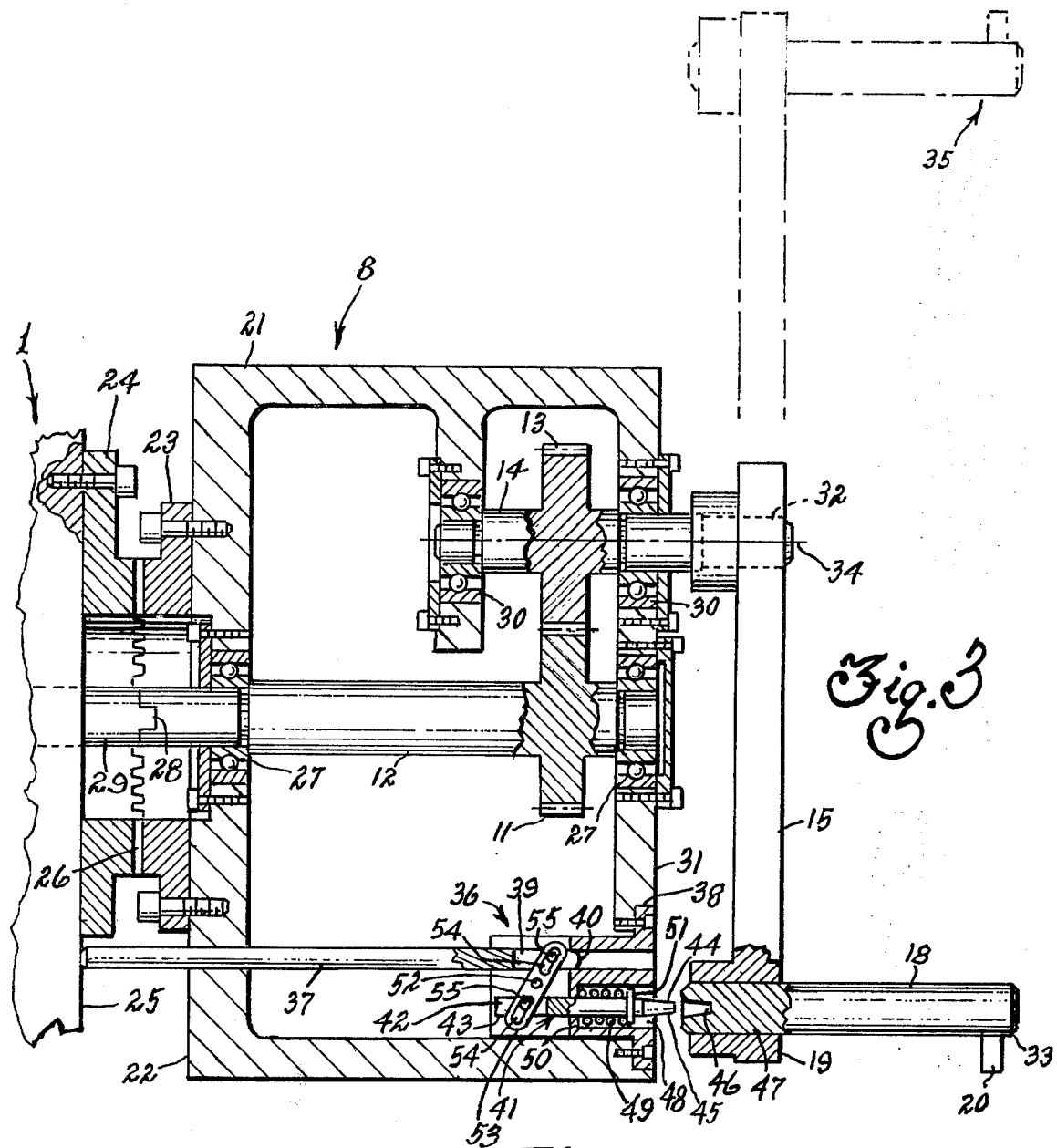
FIG. 3 is a section through the toolhead housing taken along the line 3—3 on FIG. 2.

Turning now to FIG. 3, the section through the box-like housing 21 of the boring toolhead 8 is shown and on the rear face 22 a registering means 23 is adapted to fit a complementary registering means 24 on the machine tool face 25. In this instance, a mulitooth facial coupling 26 capable of a high degree of precision registration has been used for registering means 23 and 24.

In the center of the housing is shown the input shaft 12, rotatably mounted in bearings 27, having a suitable coupling 28 provided at one end so that a main drive power shaft 29 may be connected thereto to introduce power from a prime mover within the machine tool 1.

The other end of the input shaft is provided with a driving gear 11 which forms part of the shaft 12 and transmits rotary power to an output shaft 14 which is displaced from and is parallel to, the input shaft 12. The output shaft 14 is rotatably mounted in bearings 30 and has a driven gear 13 forming a part thereof to accept rotary power for the transmission of rotary motion to the boring arm 15.

The output shaft 14 extends through the front housing plane 31 and has mounted thereon its external end 32, a boring arm 15 which extends from the corner 16a nearest the output shaft 14 to a distance proximate to the opposite diagonal corner 16b of the housing 21. The boring bar 18 is shown extending from the furthermost end 19 of the boring arm 15 and it is parallel to the output shaft 14. A boring tool 20 is provided and affixed proximate to the furthermost end 33 of the boring bar 18.

When the boring arm 15 is rotated about the centerline 34 of the output shaft 14 the boring tool 20 reaches to the phantom position 35 shown and is capable of boring a maximum diameter, the center of which is the output shaft 14. The solid position shown in FIG. 3 is the home or "park" position of the boring arm 15 when the boring toolhead 8 is transferred from the machine to a storage location 4.

The detent latching mechanism 36 is provided so that the boring arm 15 is held in its park position while traveling from machine tool 1 to tool storage matrix 4. A rod 37 is carried in both the housing 21 and a support block 38 and a slot 39 is formed in one end of the rod 40. A detent plunger 41 is also carried in the support block 38 and has a slot 42 at one end 43 and a tapered point 44 at the outboard end 45. A mating tapered hole 46 is provided at end 47 of the boring bar 18 to permit engagement of the detent plunger 41 with the bar 18 when in the park position.

A counterbore 48 is provided in the support block 38 to contain a spring 49 which reacts against the bottom 50 of the counterbore 48 and against a retaining ring 51 on the detent plunger 41. In this manner the spring 49 always tends to bias the detent plunger 41 outward and into engagement with the boring bar 18.

A pivot pin 52 is maintained in the support block 38 through a pivot link 53 which is connected to both the rod 37 and the detent plunger 41 in their respective slots, 39, 42, by means of a slot 54 in each end of the pivot link 53 and pins 55 through each of the rod 37 and the detent plunger 41. The rod 37 is slidably maintained in the housing 21 and the support block 38 and the detent plunger 41 is slidably maintained in the support block 38. Thus, when the boring toolhead 8 is located on the machine tool 1 the rod 37 strikes a machine face 25 and is pushed inward toward the housing 21 and the action of the pivot link withdraws the forward-biased detent plunger 41 from the boring bar 18. Thereafter, when the boring toolhead 8 is removed from the machine face 25 the spring 49 will urge the detent plunger 41 into engagement with the boring bar 18 since the rod 37 is free.

Many types of latching mechanisms may be substituted for the one depicted, and in some instances when the boring toolhead 8 is either being removed from the machine manually for storage or when sufficient friction exists within the rotatable members of the boring toolhead 8, it may not be necessary to provide a latching mechanism 36 to hold the arm 15 in the park position.

Figure 4:
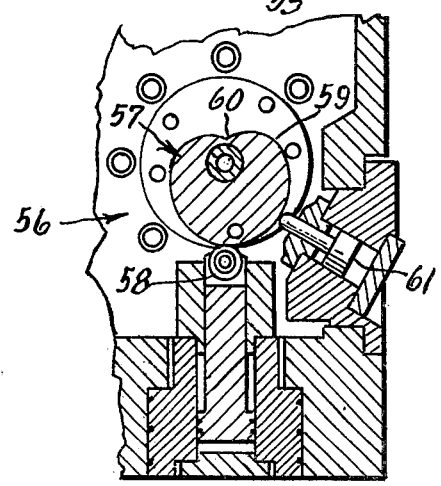
FIG. 4 is a section through a spindle orienting mechanism taken through the machine tool main drive power shaft.

FIG. 4 depicts a spindle orienting mechanism 56 as disclosed in U.S. Pat. No. 3,587,359 of McCash et al., wherein a heart shaped cam 57 is affixed to the main drive power shaft 29 so that the main drive power shaft 29 can be stopped at a predetermined angle. A plunger-roller mechanism 58 is forced against the cam surface 59 until a detent portion 60 is reached, wherein locking will be facilitated. An assist piston 61 is shown to urge the cam 57 in a preferred direction when the plunger-roller mechanism 58 is unable to do so. Other types of orienting mechanisms may be used to position the boring arm 15, either operating directly on the output shaft 14 or on the main drive power shaft 29, as in this case. When the mechanism 56 depicted is used, the driving gear 11 and the driven gear 13 must be of an equal diameter so that repeated orientation of the main drive power shaft 29 will always repeat angular orientation of the boring arm 15.

It is obvious, therefore, that minor changes may be made in the form and construction of the invention without departing from the material and spirit thereof. It is not, however, desired to confine the invention to the exact form herein shown and described, but it is desired to include all such as properly come within the scope claimed.

What is claimed is:

1. In a machine tool utilizing interchangeable tool heads, the boring tool head comprising:
 a. a housing, having an input face adapted to be received on a machine tool, and further having an output face disposed away from said input face on said housing;
 b. an input shaft passing through said input face, rotatably mounted and centrally located within said housing;
 c. an output shaft, passing through said output face, rotatably carried in said housing and displaced from said output shaft and drivingly connected thereto;

d. a boring arm, having one end connected to said output shaft and having the other end supporting a boring tool such that rotation of said output shaft causes said boring tool to swing in an arcuate path, wherein said arcuate path extends beyond the perimeter of said housing when viewed along the axis of said arcuate path; and e. a latching mechanism affixed to said housing and operable to maintain said boring arm in a predetermined angular position while transporting said tool head to and from a tool head storage matrix, and further operable to automatically release said boring arm for free rotation when said tool head is employed for use at a machining site.

2. The tool head of claim 1, wherein the length of said boring arm measured from the center of said output shaft is less than the furthermost radial dimension from the center of said output shaft to the edge of said output face.

3. The tool head of claim 1, further comprising registering means affixed to said housing input face, to locate said housing on a cooperating machine tool registering means.

4. The tool head of claim 1, further comprising a suitable coupling affixed to said input shaft to connect said input shaft to a prime mover shaft on said machine tool.

5. The tool head of claim 1, wherein said latching mechanism comprises a detent means having a detent pin operable to engage and disengage a pin socket in said boring arm.

* * * * *